United States Patent
Stuck

[15] 3,677,586
[45] July 18, 1972

[54] BALL JOINT WITH COVER PLATE FOR VEHICLES LINKAGES

[72] Inventor: Klaus Stuck, Buderich, Germany
[73] Assignee: A. Ehrenreich & Cie
[22] Filed: Sept. 22, 1970
[21] Appl. No.: 74,415

[30] Foreign Application Priority Data

Oct. 22, 1969  Germany......................P 19 53 115.8

[52] U.S. Cl.............................................287/87, 29/149.5 B
[51] Int. Cl. ...............................................................F16c 11/06
[58] Field of Search......................287/87, 90 R, 90 C, 85 A; 29/149.5 B; 219/121 EB

[56] References Cited

UNITED STATES PATENTS

| | | |
|---|---|---|
| 3,555,662 | 1/1971 | Powell............................219/121 EB |
| 3,249,375 | 5/1966 | Herbenar..............................287/90 R |
| 3,384,308 | 5/1968 | Cupler..............................219/121 EB |
| 3,413,023 | 11/1968 | Herbenar...................................287/87 |

FOREIGN PATENTS OR APPLICATIONS 1,299,403  6/1962  France................................287/90 R

OTHER PUBLICATIONS 1,176,296, 8/1964, Hoger 2 dwg. 3 spec. printed application (German).

Primary Examiner—Andrew V. Kundrat
Attorney—Arthur Schwartz

[57] ABSTRACT

A ball and socket joint having a cylindrical bore in the joint housing, a bearing element in the bore surrounding the ball member and a cover having a peripheral edge coextensive with the end of the housing and electron beam welded thereto.

2 Claims, 1 Drawing Figure

Patented July 18, 1972
3,677,586
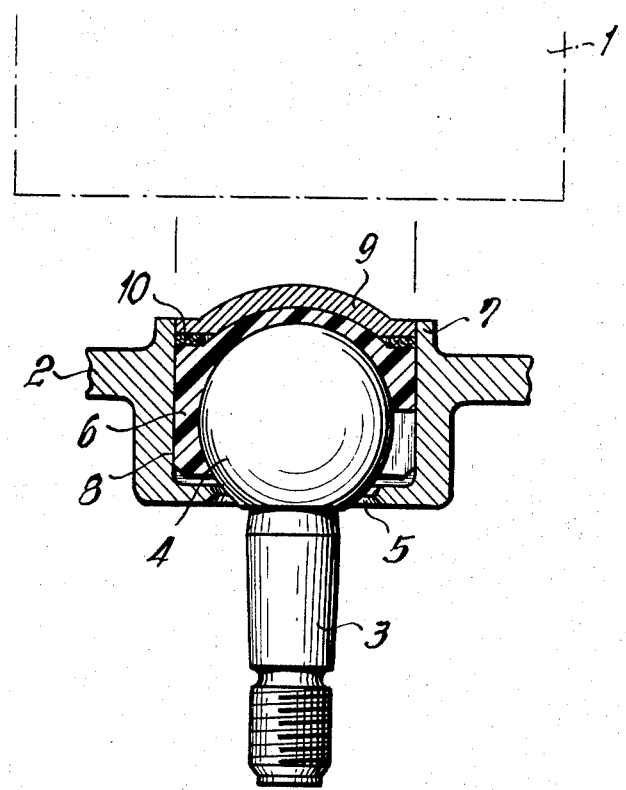
INVENTOR
KLAUS STUCK
BY:
Arthur Schwartz
ATTORNEY

BALL JOINT WITH COVER PLATE FOR VEHICLES LINKAGES

BACKGROUND OF THE INVENTION

1. Field of the Invention

The invention relates to ball joints, and in particular to ball joints for use in motor vehicles in their steering linkage and wheel suspension linkage, where the ball joint consists of a joint housing and a joint pin having its ball element supported in the body for omni-directional mobility. One side of the housing is closed by means of a cover plate which is recessed into the housing and which retains the joint elements in the housing cavity.

2. Description of the Prior Art

Ball joints of the type mentioned above are generally closed by means of a cover plate which is crimped onto the joint housing. This crimping attachment of the cover plate necessitates additional height on the housing, the overlapping edge being rolled toward the inside and over the cover plate edge. This gives a greater overall height to the ball joint, even after the crimping operation. In the case of mass-produced ball joints, even a small addition in the amount of material required can represent a noticeable increase in production cost. The crimping assembly of the cover plate gives the ball joint a pre-determined ease of mobility, as determined by the production tolerances.

SUMMARY OF THE INVENTION

The basic objective underlying the present invention is to provide a ball joint with a cover closure where an ecomony in material requirements and, as the case may be, a reduction in overall height is achieved. At the same time, it is possible to perform the closing operation with ease, speed and safety, as well as giving a perfect seal. In addition, the ease of mobility of the ball joint can be adjusted at will during the assembly operation by varying the assembly pressure.

The above objective is attained by the invention, in that preferably the cover plate is connected to the joint housing by means of a weld produced by an electron beam.

The above type of cover assembly requires no addition of third materials and thus offers material savings in the joint housing. The cover closure obtained is perfectly tight, without using any sealing material. The electron beam produces a weld seam of narrow width, with a depth that is large compared to its width, thereby guaranteeing safety and tightness of the closure. The depth obtained is adequate even when the welding operation is performed in the open atmosphere. The welding operation can be performed very rapidly, as it is sufficient to position the joint housing with the cover plate inserted therein under the electron beam gun in such a way that the beam is focused onto the circular joint between the housing and the cover plate. The housing is rotated around its axis while being held in a chuck. A particular advantage resides in the minimazation of structural defects with this type of welding. A further advantage is the accuracy obtainable with the electron beam.

The bore of the joint housing is preferably so designed that the bore portion accomodating the cover plate has at least in its transition with the bore portion holding the bearing element, being pressed against the ball end by the cover plate, a diameter no greater than that of the latter bore portion. Therefore, there is a cross-section shape which allows an inward advance of the cover plate against the adjacent bearing element.

This feature offers the advantage that the assembly pressure, i.e., the pressure of the cover plate against the bearing element pressing against the ball end, can be freely chosen during the welding operation, so as to obtain any desired ease of mobility of the assembled ball joint.

The upstanding edge of the joint housing accomodating the cover plate need not be higher than determined by the thickness of the cover plate or the height of its peripheral edge.

It may be desirable in certain cases to provide between the cover plate and the adjacent joint elements in the housing cavity, against at least the cover wall portion affected by the welding operation, a heat resistant insulating layer. This may be in the form of an annular disc of asbestos if there is any risk that the welding heat might have detrimental effects on the parts inside the housing cavity.

BRIEF DESCRIPTION OF THE DRAWING

In the accompanying drawing is illustrated, by way of an example, an embodiment of the invention, where:

The sole FIGURE shows a vertical cross-section of a ball joint with cover closure, embodying the invention.

DESCRIPTION OF THE PREFERRED EMBODIMENT

In the Figure, an electron beam gun is only indicated schematically as to its position, guns of this type and their accessories being known.

The ball joint chosen to embody the present invention consists of a drop-forged joint housing or body 2 and a ball stud or joint pin 3. A ball element 4 is supported inside the joint housing 2 for omnidirectional mobility.

The joint pin 3 is inserted into the body 2 through the side opposite a pin passage 5, so that the ball element is positioned inside the housing cavity and the bearing socket 6 surrounds the ball element 4. The housing bore portion 7, which accomodates a cover plate 9, has the same diameter as the housing bore portion 8 which holds the bearing socket 6 thereby forming a cylindrical bore in the housing. The height of the portion 7 corresponds approximately to the thickness of the cover plate 9. The bearing socket may be made of metal, and it may have a plurality of slots extending from the face adjacent to the stud passage 5. However, it can also be visualized using another material for the bearing socket 6, which material remains unaffected by the welding heat reaching it, such as a suitable plastic material. The joint housing 2 is closed by the cover plate 9. The cover plate is inserted into the bore, so that the cover plate is recessed therein. The cover plate is then connected to the joint housing 2 along its peripheral edge by an electron beam welding operation. The electron beam gun 1 projects its beam against the circular joint between the cover plate 9 and the body 2. Between the peripheral portion of the cover plate and the bearing socket 6 may be arranged on annular disc 10 of a heat resistant, insulating material, such as asbestos. It is likewise possible to provide an insulating, heat resistant intermediate layer which covers the bearing socker 6.

To perform the electron beam welding operation, the joint housing 2 is held in a chuck which can be rotated at a suitable speed. The cover plate 9 is inserted and, if necessary, subjected to pressure by means of a support which is rotatable relative to it. During the welding operation, the joint housing 2 is rotated so that the electron beam creates a continuous weld seam indicated at 11. A single revolution is sufficient.

The electron beam welding operation may also be performed under a vacuum.

I claim:

1. A ball and socket joint comprising:
   a. a joint housing having a pair of ends,
   b. a ball element in said housing,
   c. a joint pin attached to said ball element and extending outwardly of said housing through one of said ends,
   d. a cover closing the housing at the other of said ends,
   e. said cover connected to said housing by means of an electron beam weld,
   f. a bearing element surrounding a portion of said ball member and contacting said cover and the interior of said housing, and
   g. a heat resistant insulating layer positioner between part of said cover and said bearing element.

2. A ball and socket joint as defined in claim 1 wherein the inner surface of said housing has a cylindrical bore, said other of said ends terminating with the outer peripheral edge of said cover.

* * * * *